United States Patent
Dos Santos

(10) Patent No.: US 11,148,885 B1
(45) Date of Patent: Oct. 19, 2021

(54) TRAILING SANDWICH CONVEYOR SYSTEM FOR CONTINUOUS MINING MACHINES ALONG A HIGH-ANGLE TUNNEL

(71) Applicant: Joseph Anibal Dos Santos, Marietta, GA (US)

(72) Inventor: Joseph Anibal Dos Santos, Marietta, GA (US)

(73) Assignee: Dos Santos International, Marietta, GA (US)

( * ) Notice: Subject to any disclaimer, the term of this patent is extended or adjusted under 35 U.S.C. 154(b) by 0 days.

(21) Appl. No.: 17/247,887

(22) Filed: Dec. 29, 2020

(51) Int. Cl.
 - *B65G 15/18* (2006.01)
 - *B65G 39/12* (2006.01)
 - *B65G 15/08* (2006.01)
 - *B65G 15/16* (2006.01)

(52) U.S. Cl.
CPC .............. *B65G 15/18* (2013.01); *B65G 15/08* (2013.01); *B65G 15/16* (2013.01); *B65G 39/125* (2013.01); *B65G 2201/0276* (2013.01)

(58) Field of Classification Search
CPC ........ B65G 15/08; B65G 15/14; B65G 15/16; B65G 15/18; B65G 39/12; B65G 39/125; B65G 39/14; B65G 2201/042; B65G 2201/0276; E21F 13/04
See application file for complete search history.

(56) References Cited

U.S. PATENT DOCUMENTS

| | | | |
|---|---|---|---|
| 3,762,534 A | 10/1973 | Beresinsky | |
| 4,561,537 A | 12/1985 | Dos Santos | |
| 4,565,281 A * | 1/1986 | Kramer | B65G 15/16 198/311 |
| 4,609,097 A | 9/1986 | Dos Santos | |
| 4,664,251 A * | 5/1987 | Gough | B65G 15/16 198/607 |
| 4,765,461 A | 8/1988 | Ozolins et al. | |
| 4,872,542 A | 10/1989 | Enneking | |
| 6,185,847 B1 | 2/2001 | Russell et al. | |
| 6,264,022 B1 * | 7/2001 | Petack | B65G 15/16 198/626.4 |
| 6,484,870 B2 | 11/2002 | Bohnker et al. | |
| 6,848,748 B2 | 2/2005 | Paschedag et al. | |
| 8,033,385 B2 | 10/2011 | Brewka et al. | |
| 9,731,903 B2 | 8/2017 | Hartcher | |
| 9,815,627 B2 | 11/2017 | dos Santos et al. | |
| 9,822,640 B2 | 11/2017 | Baird, Jr. | |
| 9,884,729 B1 * | 2/2018 | Nix | F16M 13/02 |
| 10,071,854 B2 | 9/2018 | Becker et al. | |
| 10,894,665 B2 * | 1/2021 | Wilson | B65G 39/14 |
| 2008/0283368 A1 | 11/2008 | Brewka et al. | |
| 2013/0168209 A1 | 7/2013 | Fanshier et al. | |
| 2014/0231398 A1 | 8/2014 | Land et al. | |
| 2020/0017304 A1 * | 1/2020 | Wilson | B65G 15/16 |

* cited by examiner

*Primary Examiner* — Gene O Crawford
*Assistant Examiner* — Keith R Campbell
(74) *Attorney, Agent, or Firm* — Dunlap Bennett & Ludwig, PLLC

(57) ABSTRACT

A continuous mining machine trailing conveyor system providing a sandwich belt system that incorporates a set of hugging modalities to ensure that the sandwich belt system provides sufficient friction.

5 Claims, 6 Drawing Sheets

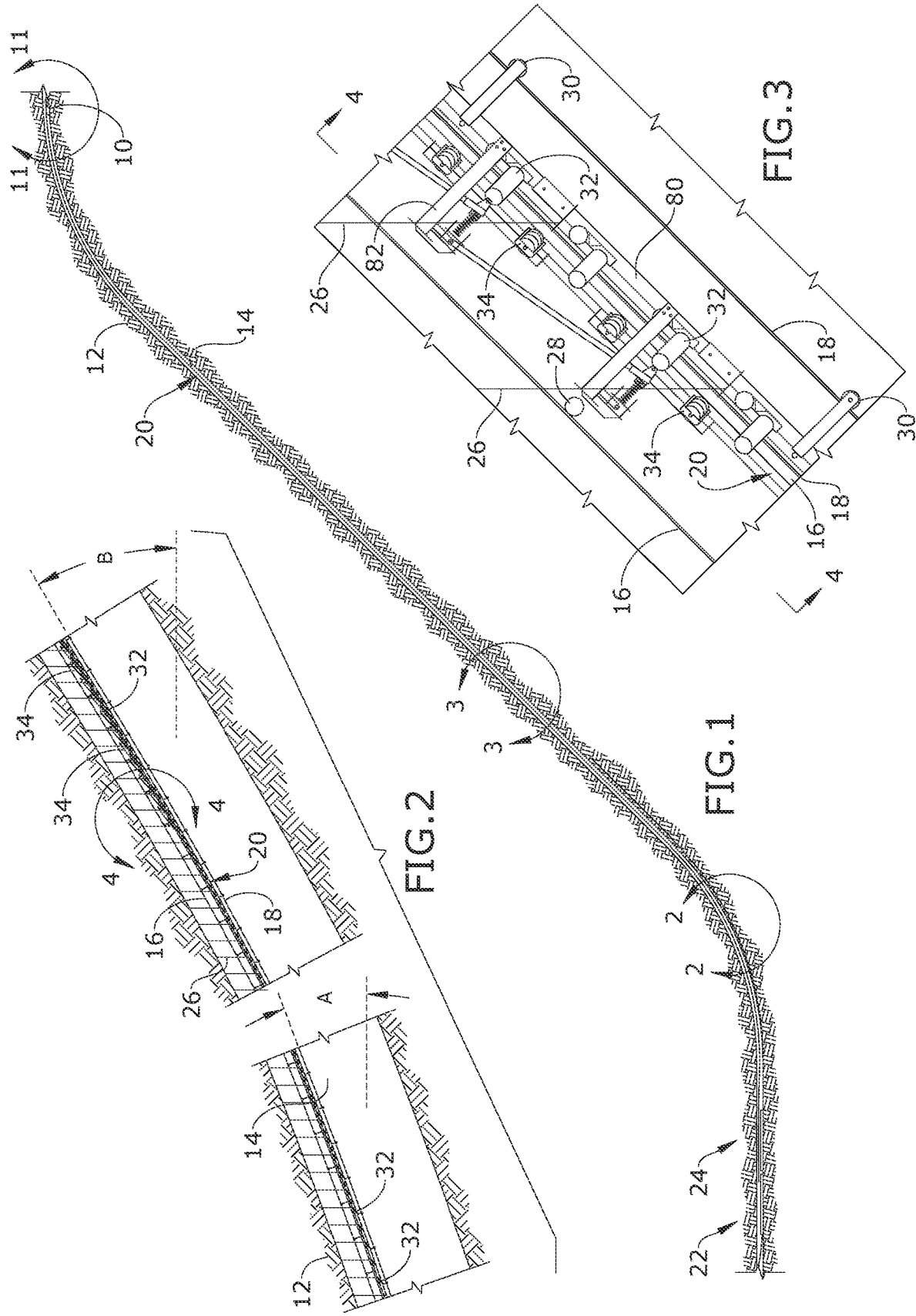

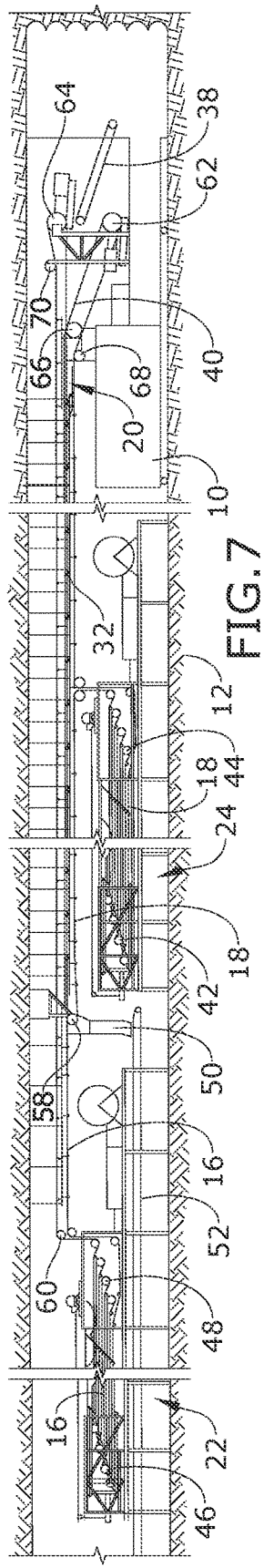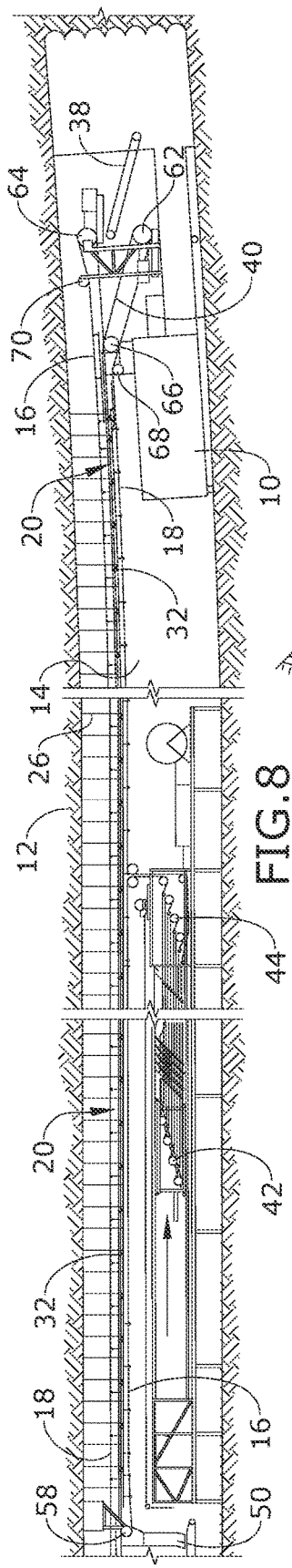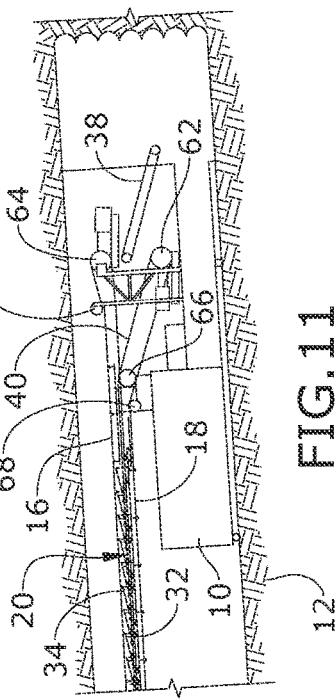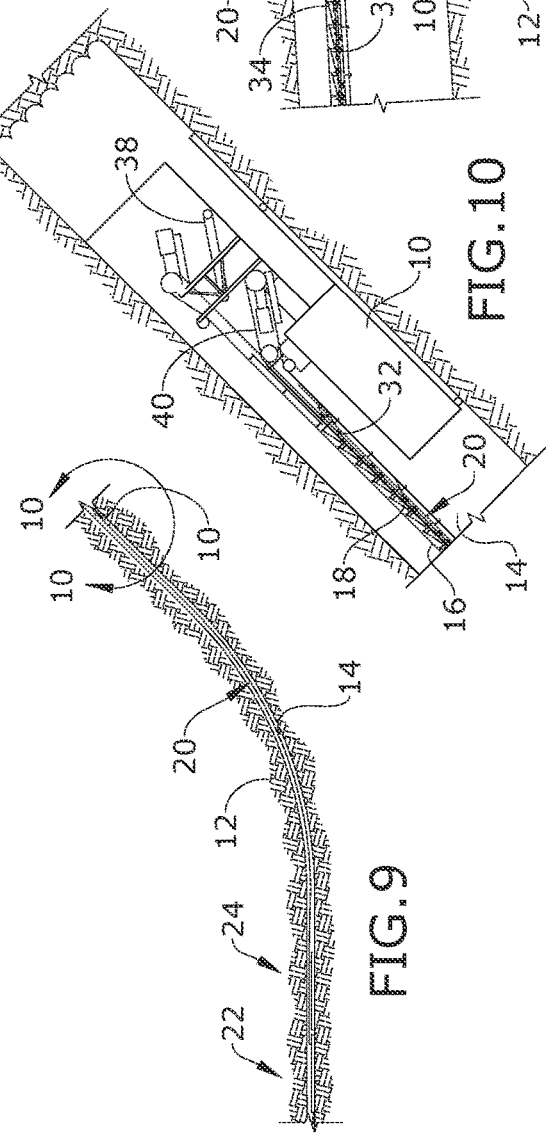

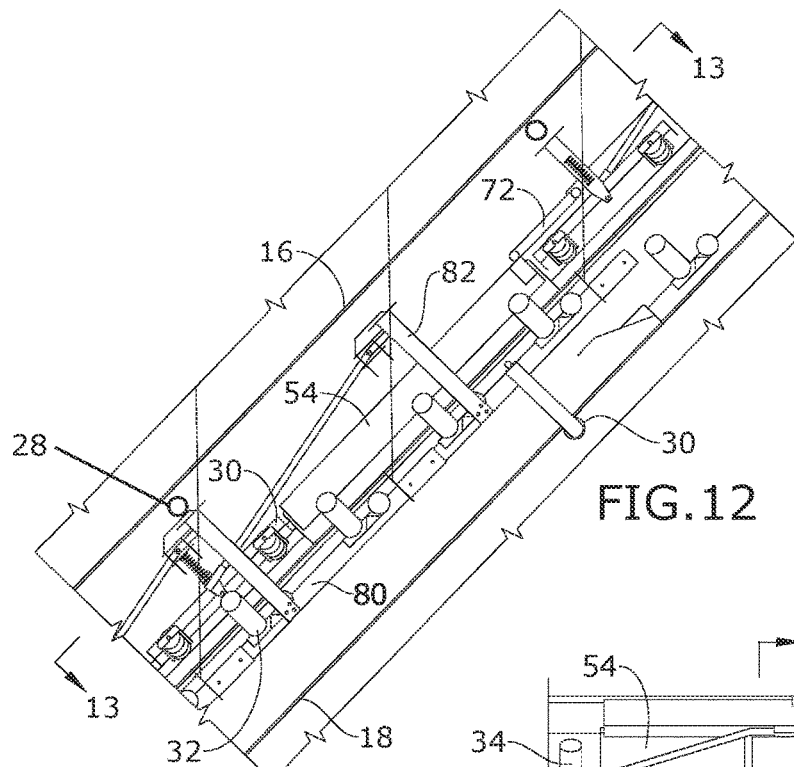
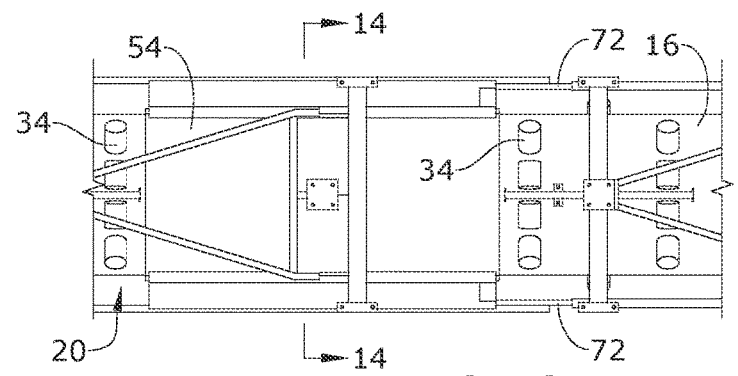
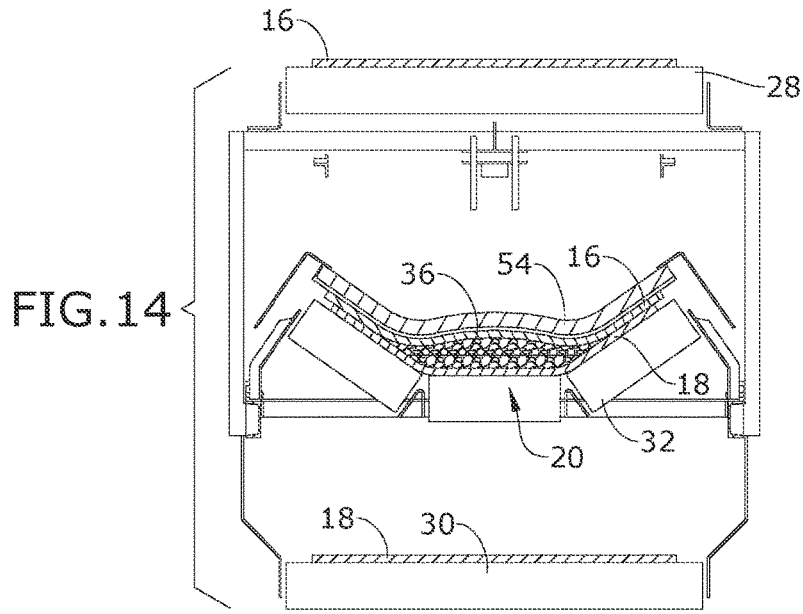

```
┌─────────────────────────────────────────────────────────────────────┐
│ THE TRAILING SANDWICH HIGH ANGLE CONVEYOR BEGINS BEHIND THE         │
│ TUNNEL BORING MACHINE (TBM) WITH A SHORT, HORIZONTAL TRAILING       │
│ CONVEYER THAT INCLUDES THE BELT STORAGE UNITS, WHERE THE TRAVELING  │
│ PULLEYS ARE AT THEIR FURTHEST EXTENSION FROM THE FIXED PULLEYS      │
└─────────────────────────────────────────────────────────────────────┘
                                   ▼
┌─────────────────────────────────────────────────────────────────────┐
│ THE TBM BEGINS BORING A TUNNEL, WITH THE MUCK BEING                 │
│ CARRIED AWAY IN THE TRAILING SANDWICH CONVEYOR                      │
└─────────────────────────────────────────────────────────────────────┘
                                   ▼
┌─────────────────────────────────────────────────────────────────────┐
│ AS THE TBM ADVANCES INTO THE TUNNEL, WORKERS ANCHOR CHAINS INTO THE │
│ TUNNEL CEILING WHILE OTHER WORKERS ADD CONVEYOR STRUCTURE TO THE    │
│ HANGING CHAINS                                                      │
└─────────────────────────────────────────────────────────────────────┘
                                   ▼
┌─────────────────────────────────────────────────────────────────────┐
│ THE TRAVELING PULLEYS IN THE BELT STORAGE AREA TRAVEL TOWARD        │
│ THE FIXED PULLEYS, AND THE BELTS ARE PAID OUT AS THE TBM AND BELT   │
│ TRAILER ADVANCE AND THE SANDWICH CONVEYOR IS LENGTHENED             │
└─────────────────────────────────────────────────────────────────────┘
                                   ▼
┌─────────────────────────────────────────────────────────────────────┐
│ ONCE THE TRAVELING PULLEYS MEET THE FIXED PULLEYS AND THE BELTS IN  │
│ THE STORAGE AREA ARE FULLY PAID OUT, BORING IS HALTED SO THAT       │
│ ADDITIONAL BELTING CAN BE ADDED TO THE STORAGE UNIT, RETRACTING THE │
│ TRAVELING PULLEYS TO THEIR BEGINNING POSITION                       │
└─────────────────────────────────────────────────────────────────────┘
                                   ▼
┌─────────────────────────────────────────────────────────────────────┐
│ THE PROCESS OF PULLING THE BELTS FROM THE STORAGE AREA AND THEN     │
│ ADDING MORE BELTING IS REPEATED AS MANY TIMES AS IS NEEDED TO       │
│ PROVIDE ENOUGH OF A SANDWICH CONVEYOR FOR THE FULL LENGTH OF THE    │
│ TUNNELING PROJECT                                                   │
└─────────────────────────────────────────────────────────────────────┘
                                   ▼
┌─────────────────────────────────────────────────────────────────────┐
│ AS THE TBM BEGINS TO GO UP ABOVE THE LOW ANGLE, E.G. TWENTY DEGREES,│
│ THE WORKERS REDUCE THE SPACING OF THE CARRYING IDLERS BY HALF       │
└─────────────────────────────────────────────────────────────────────┘
                                   ▼
┌─────────────────────────────────────────────────────────────────────┐
│ AS THE ANGLE OF THE TBM INCREASES, AT ABOUT THIRTY DEGREES OF       │
│ INCLINE, PRESSING ROLLS ARE ADDED TO GUARANTEE ENOUGH FRICTION TO   │
│ KEEP THE TUNNEL MUCK FROM SLIDING WITHIN THE SANDWICH CONVEYOR      │
└─────────────────────────────────────────────────────────────────────┘
                                   ▼
┌─────────────────────────────────────────────────────────────────────┐
│ AT THE TUNNEL INCLINE ANGLE FROM ABOUT 30 DEGREES TO ABOUT          │
│ 50 DEGREES, A DECK-MOUNTED HEAVY BLANKET ON THE COVER               │
│ BELT PROVIDES A PROVISIONAL HUGGING PRESSURE WHILE A                │
│ MODULE OF PERMANENT PRESSING ROLLS IS ADDED OVER THE AREA           │
└─────────────────────────────────────────────────────────────────────┘
                                   ▼
┌─────────────────────────────────────────────────────────────────────┐
│ AT THE TUNNEL INCLINE ANGLE ABOVE ABOUT 50 DEGREES, SPRUNG AIR      │
│ PLENUMS ON THE COVER BELT PROVIDE A PROVISIONAL HUGGING PRESSURE    │
│ WHILE A MODULE OF PERMANENT PRESSING ROLLS IS ADDED OVER THE AREA   │
└─────────────────────────────────────────────────────────────────────┘
                                   ▼
┌─────────────────────────────────────────────────────────────────────┐
│ AS THE ANGLE OF THE TBM INCREASES, THE ANGLE OF THE RECEIVING BELT  │
│ IS ADJUSTED IN RELATION TO THE CONVEYING BELT IN ORDER TO COMPENSATE│
│ FOR THE LIMITED RANGE OF THE CONVENTIONAL LOADING ANGLE             │
└─────────────────────────────────────────────────────────────────────┘
                                   ▼
┌─────────────────────────────────────────────────────────────────────┐
│ AS THE TBM REACHES THE END OF THE TUNNEL AND ITS ANGLE DECREASES,   │
│ THE ANGLE OF THE RECEIVING BELT IS AGAIN ADJUSTED TO ACCOUNT FOR    │
│ THE CHANGE                                                          │
└─────────────────────────────────────────────────────────────────────┘
```

FIG.18

TRAILING SANDWICH CONVEYOR SYSTEM FOR CONTINUOUS MINING MACHINES ALONG A HIGH-ANGLE TUNNEL

BACKGROUND OF THE INVENTION

The present invention relates to continuous mining machines and, more particularly, a tunnel boring machine trailing conveyor system with a sandwich belt system and operatively associated hugging system.

In a typical mining operation such as tunneling, it is well known to use a continuous mining machine, such as a tunnel boring machine, to advance the mine face. The rock material or muck produced by the advancing tunnel boring machine can be hauled from the face area by means of an extensible conveyor belt system that trails the advance of the tunnel boring machine.

The traditional tunnel boring machine trailing conveyor utilizes an open troughed belt conveyor that is ineffective at any angle of incline above where the rock material slides back; this is typically at an angle of incidence of about 15 to 18 degrees.

As can be seen, there is a need for a trailing conveyor system for a tunnel boring machine that provides for continuous haulage of tunnel muck from a mine face along conveyor path angles of incidence up to 90 degrees.

The trailing sandwich conveyor system embodied in the present invention provides a sandwich belt assembly incorporating a sandwich hugging system capable of conveying the muck at conveyor path angle up to 90 degrees. The tail drive and loading stations are mounted onto the trailing deck of the continuous mining machine. A workstation on the trailing deck facilitates adding the conveyor structure (at the tunnel) as the continuous mining machine advances. Belt storage units associated with the top and bottom belts payout the belt as the continuous mining machine advances and the conveyor lengthens. The sandwich hugging system enables the sandwich belt system to remain effective at high conveyor path angles.

SUMMARY OF THE INVENTION

In one aspect of the present invention, a method of conveying material along a tunnel having an incline over fifteen degrees to about thirty degrees, only an upper cover belt is required over the conveyed muck and the bottom belt in order to convey the muck without any backwards sliding as it moves along the high angle conveying path.

In another aspect of the present invention, a method of conveying material along a tunnel having an incline over about thirty degrees to about fifty degrees, the method includes adding one or more pressing rolls along an upper surface of a top belt of a sandwich belt conveyor and laying a weighted blanket along said upper surface prior to adding the one or more pressing rolls, and wherein the one or more pressing rolls are added initially to the weighted blanket, and wherein the one or more pressing rolls transition from the weighted blanket to said upper surface.

In yet another aspect of the present invention, a method of conveying material along a tunnel having an incline over about fifty degrees, the method includes pressing one or more plenums, with shield plates above these plenums, along said upper surface prior to adding the one or more pressing rolls, wherein the one or more pressing rolls are added initially onto the shields of the one or more said plenums prior to transitioning to said upper surface, and wherein the one or more pressing rolls transition from the one or more shield to said upper surface. The shields may be a necessary part of the pressing system because they allow the workers at the trailing deck to safely add the pressing rolls system onto over the plenums (while the conveyor is running) and they provide the continuous surface that the pressing rolls roll on as they transition onto the top belt as the shields, with the plenums, pull away with the TBM as it advances.

These and other features, aspects and advantages of the present invention will become better understood with reference to the following drawings, description and claims.

BRIEF DESCRIPTION OF THE DRAWINGS

FIG. 1 is a schematic view of an exemplary embodiment of the present invention showing the continuous mining machine and trailer 10 at the top of the high-angle conveyor path and the sandwich conveyor 20 fully installed along the extent of the high-angle conveyor path;

FIG. 2 is a detail schematic view taken along line 2-2 in FIG. 1, showing an installed conveyor assembly of an exemplary embodiment of the present invention, illustrating the reduced spacing of carrying idlers 32 as the angle of the conveyor path increases from a generally zero-degree angle to a lower to moderate angle of incidence A, up to approximately 20°, and the addition of spring-loaded pressing rolls 34 to the conveyor assembly along portions of the conveyor path having a moderately high conveyor path angle of incidence B (approximately 30° to) 50°;

FIG. 3 is a detail schematic side view of the conveyor assembly at a high angle conveyor path taken along line 3-3 in FIG. 1, approximately 50 to 90 degrees, of an exemplary embodiment of the present invention;

FIG. 7 is a detail schematic view of an exemplary embodiment of the present invention, illustrating the belt storage area when the continuous mining machine and trailer 10 are at the lowest angle, beginning to pull belts from the belt storage areas 22 and 24 as the continuous mining machine begins its advance into the excavation;

FIG. 8 is a detail schematic view of an exemplary embodiment of the present invention, illustrating a belt storage area 24 with the traveling tensioning pulleys 42 nearing the stationary pulleys 44 as the continuous mining machine advances the mine face through excavation. When travelling pulleys 42 reach the limit of their travel toward the stationary pulleys 44, the continuous mining machine excavation must stop and an additional bottom belt of the sandwich conveyor is fed into the storage area, moving the travelling pulleys 42 back to their extended position. The added belt is spliced into and becomes part of bottom belt 18. Simultaneously (not shown) the exact same thing happens at the top belt storage area 22, where additional belting is added, spliced into and becomes part of top belt 16. With the additional top and bottom belts installed the continuous mining machine resumes operation. Tunnel boring continues and begins to go up at an angle, showing movement of travelling pulleys 42 as top belt 16 and bottom belt 18 are paid out;

FIG. 9 is a schematic view of an exemplary embodiment of the present invention, illustrating the tunnel boring machine and trailer 10 at a midway point of installation along the high angle tunnel;

FIG. 10 is a detail schematic view of an exemplary embodiment of the present invention, illustrating the continuous mining machine and trailer 10 midway up the bored tunnel, showing the approximate relationship of receiving area 40 and the muck loading belt 38;

FIG. 11 is a detail schematic view of an exemplary embodiment of the present invention, illustrating the continuous mining machine and trailer 10 at the top of the bored tunnel, showing the relationship between receiving area 40 and the muck loading belt 38 transporting the muck 36 to the sandwich belt conveyor—in other words, a transfer conveyor belt section for hauling the muck material from adjacent the mining tool to the sandwich belt conveyor;

FIG. 12 is a detail schematic section view of an exemplary embodiment of the present invention, showing the use of a heavy blanket 54 along high angle conveyor paths of about 30 degrees up to approximately 50 degrees incline. The heavy blanket 54 acts as a provisional hugging device while each permanent module of fully equalized pressing rolls 34 is being installed, first onto the heavy blanket 54 then rolls onto the top belt 16 as the heavy blanket 54 advances with the continuous mining machine;

FIG. 13 is a schematic section view of an exemplary embodiment of the present invention, taken along line 13-13 in FIG. 12;

FIG. 14 is a detail schematic section view of an exemplary embodiment of the present invention, illustrating the use of heavy blanket 54 at high angles up to about 50 degrees incline, as a provisional hugging device while each permanent module of fully equalized pressing rolls 34 is being installed;

FIG. 18 is a flow chart of an exemplary embodiment of the present invention, wherein the continuous mining machine is a tunnel boring machine (TBM).

DETAILED DESCRIPTION OF THE INVENTION

Figure 4:
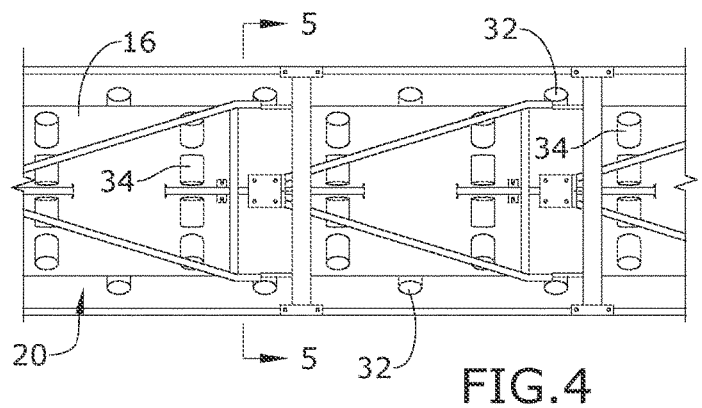
FIG. 4 is a detail schematic section view of the conveyor assembly of an exemplary embodiment of the present invention, taken along line 4-4 in FIG. 3.
Figure 5:
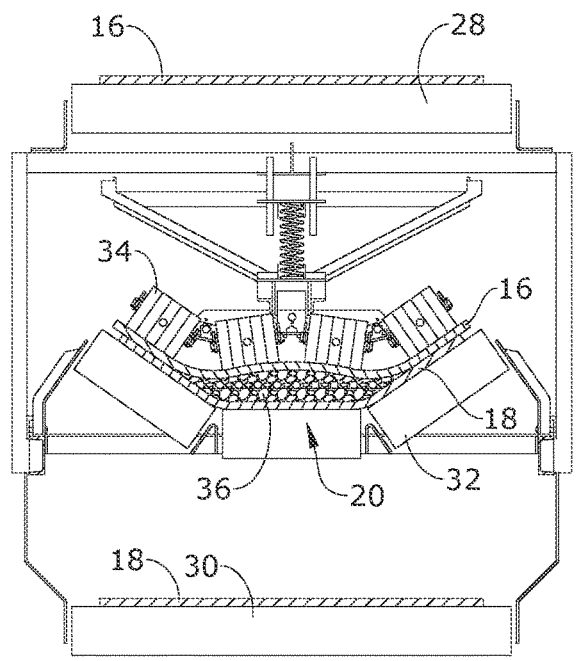
FIG. 5 is a detail schematic section view of the extensible conveyor belt system of an exemplary embodiment of the present invention, taken along line 5-5 in FIG. 4, illustrating the sandwich belt system—the top belt 16 and the bottom belt 18 sandwiching the muck 36 to ensure there is enough friction to keep the tunnel muck from sliding within the sandwich conveyor—at a portion of the extensible conveyor belt system disposed along a high angle conveyor path, and the pressing roller 34 incorporated in the sandwich belt system.
Figure 6:
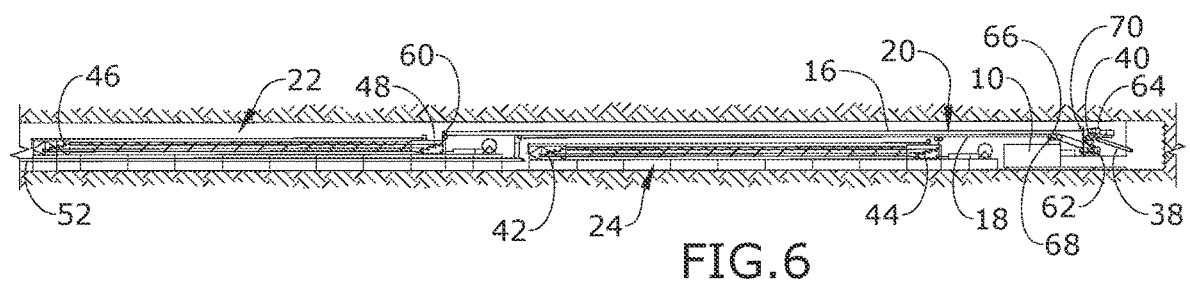
FIG. 6 is a schematic view of an exemplary embodiment of the present invention, showing the continuous mining machine and trailer 10 at the lowest angle of the conveyor path (or baseline) at launching of the continuous mining machine as it just begins to excavate the tunnel 14, illustrating travelling pulleys 42 and 46 at their maximum distance from the fixed pulleys 44 and 48 respectively.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a continuous mining machine trailing conveyor system providing a sandwich belt system that incorporates a set of hugging modalities to ensure that the sandwich belt system provides sufficient friction for the high conveying angle.

Referring now to FIGS. 1 through 18, the present invention may include a conveyor apparatus adapted to climb inclines, wherein the conveyor apparatus includes a sandwich belt conveyor system 20 having adaptive high-angle hugging modalities. The conveyor apparatus may include a top belt 16 and a bottom belt 18 with a top storage unit 22 and a bottom storage unit 24, respectively. Each storage unit 22 and 24 providing tensioning bend pulleys on travelling carriages. The top belt 16 and the bottom belt 18 comprise the sandwich belt conveyor 20 that receives the muck 36 at the tail receiving end/transfer conveyor belt section and then carries and discharges the muck 36 through a discharge chute 50 by way of a muck removal belt 52 at the proximal, lower end.

The bottom belt 18 and the top belt 16 may be operatively associated with a bottom belt head/discharge pulley 58, a top belt head/bend pulley 60, a bottom belt tail/drive brake pulley 62, and a top belt tail/drive/brake pulley 64, travelling pulleys 42 and 46 of the bottom belt storage area and of the top belt storage area, respectively, bottom belt fixed pulleys 44 of the bottom belt storage area, top belt fixed pulleys 48 of the top belt storage area, a bottom belt carrying side deflection pulley 66 after the loading area at the continuous mining machine trailing deck, a bottom belt return side deflection pulley 68 at the continuous mining machine trailing deck, and a top belt return side deflection pulley 70 at the continuous mining machine trailing deck.

At the trailing deck the tunnel muck 36 is loaded onto the bottom belt loading station 40. Just beyond, a bend pulley deflects the bottom belt 18 to a desired high angle. At a tangent to the high angle, the top belt 16 joins the bottom belt 18, at the deflection pulley 66 to form the belt sandwich with the muck 36 between them.

The trailing deck provides a workstation where conveyor structure 26 may be added and supported along the tunnel 14 of the tunnel area/conveyor path 12. The conveyor structure 26 may be made of sandwich conveyor stringer frames, carrying idlers 32, modules of fully equalized pressing rolls 34, bottom belt return idlers 30 and top belt return idlers 28, hanging chains and/or brackets that attach the conveyor structure 26 to the tunnel 14.

The present invention is a continuous mining machine conveyor apparatus having a sandwich belt configuration with its tail terminal on the trailing deck. The sandwich conveyor extends to the material discharge point as the continuous mining machine advances the mine face into the tunnel. The conveyor apparatus is adapted to progressively extend as the continuous mining machine moves along an incline. The high angle incline is defined relative to the baseline depicted in FIG. 6. An incline angle where material will slide back on an open troughed conveyor and may start a 15-degrees, and of course continue up to a high angle to 90 degrees, as would be the case in a raise bore. Practically, in most cases the high incline angles will be less than 45 degrees. The hugging functionality of the continuous mining machine trailing sandwich belt conveyor will prevent slippage of the conveyed muck continuously at a high angle as the continuous mining machine advances.

Each of the two sandwiching belts, the top belt 16 and the bottom belt 18, have a belt storage unit, past the discharge point, that will pay out the belt as the continuous mining machine advances and the continuous mining machine trailing sandwich belt system lengthens along the high angle conveyor path. The drive and loading terminal will be at the continuous mining machine trailing deck. On the trailing deck, immediately after the low angle loading point, onto the bottom belt, the bottom belt will deflect downwards around a bend pulley and the belt sandwich will form at the high angle as the top belt joins the bottom belt at this point. The workstation at this point will facilitate the addition of the conveyor structure (idlers and stringers) that will be supported at the tunnel, by chain hangers or brackets or other support arrangement. In this manner the continuous mining machine will advance while the downhill continuous mining machine trailing sandwich belt will grow in length accordingly. Conveyor supporting channel rails 80 are employed to facilitate this process, as illustrated in FIGS. 12 and 13.

Figure 15:
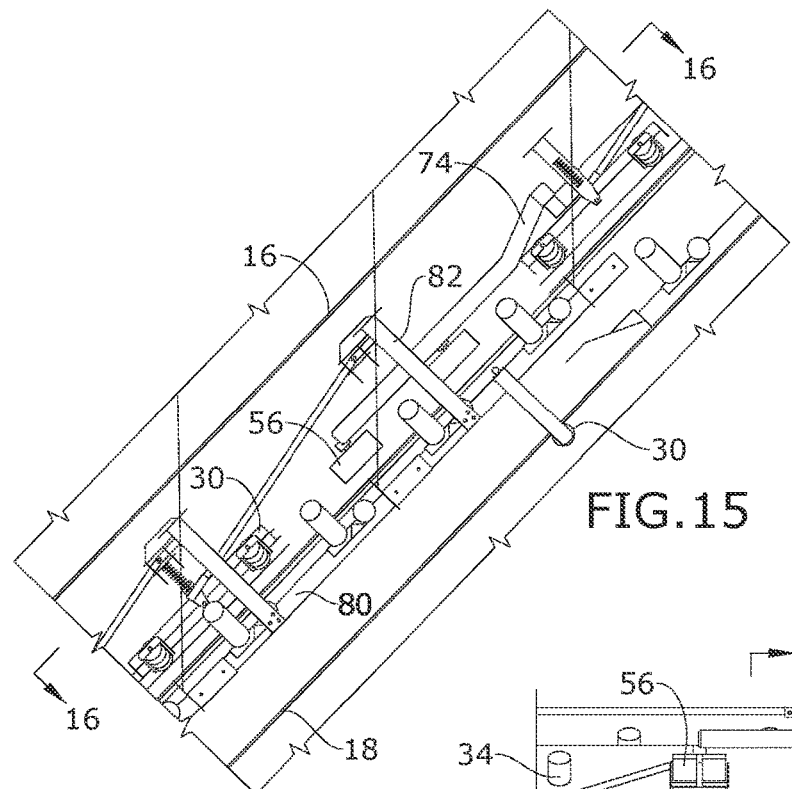
FIG. 15 is a detail schematic section view of an exemplary embodiment of the present invention, showing the use of partially equalized, sprung pressing air plenums 56 at high angles above about 50 degrees incline wherein the equalized sprung plenums 56 act as a provisional hugging device while each permanent module of fully equalized pressing rolls 34 is being installed, first onto the shields 78 of the pressing air plenums 56 then rolls onto the upper belt 16 as the air plenums 56 advance with the TBM.

The modalities of hugging the sandwich belt conveyor 20 takes different forms depending on the incline or angle of the conveyor path. Modules of fully equalized pressing rolls 34 may be necessary when conveying angles exceed approximately 30+ degrees. Upright frames 82 are utilized to secure assemblies of the spring loaded fully equalized pressing rolls 34 and to support the return rolls 28 that carry the return of the top belt 16, as illustrated in FIG. 15.

Additionally, the heavy blanket 54 may be another modality of provisional hugging the sandwich belt conveyor 20 before more permanent pressing rolls 34 are operative. Tie bars 72 may secure the heavy blanket 54, as illustrated in FIGS. 12 and 13.

Figure 16:
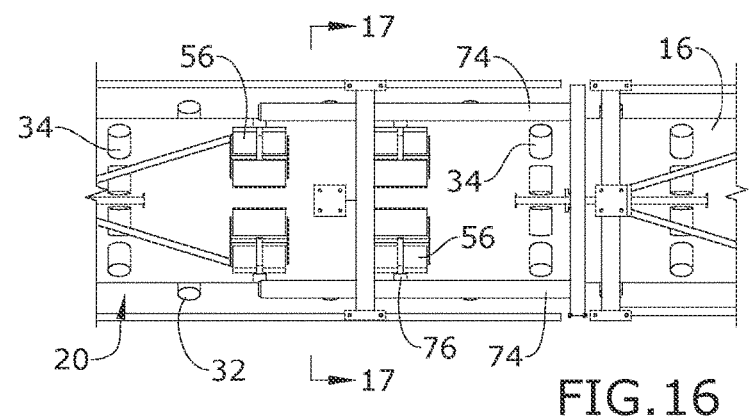
FIG. 16 is a schematic section view of an exemplary embodiment of the present invention, taken along line 16-16 in FIG. 15.
Figure 17:
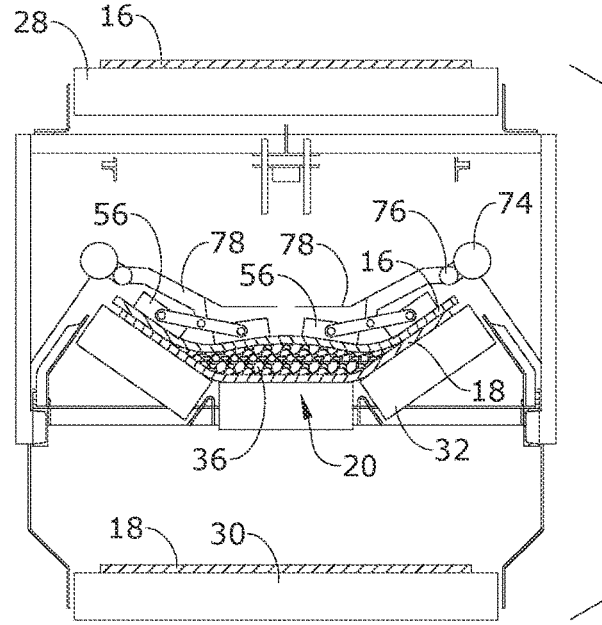
FIG. 17 is a schematic section view of a conveyor assembly of an exemplary embodiment of the present invention, taken along line 17-17 in FIG. 16, illustrating spring-loaded air plenums 56.

The air plenums 56 are another modality of provisional hugging. The air plenums 56 may include structural pipes 74, cantilevered from the continuous mining machine trailing deck structure, that support the torsi springs and partially equalized air plenums 56, as illustrated in FIGS. 15 and 16. The torsi springs are adapted to urge the partially equalized air plenums 56 onto the top belt 16, as illustrated in FIGS. 16 and 17. Steel safety shield 78 over the partially equalized air plenums 56 may be employed, as illustrated in FIG. 17, to facilitate the transition of the more-permanent pressing rolls 34 to the top belt 16.

It should be understood, of course, that the foregoing relates to exemplary embodiments of the invention and that modifications may be made without departing from the spirit and scope of the invention as set forth in the following claims.

What is claimed is:

1. A method of conveying material along a tunnel having an incline over fifteen degrees, the method comprising:
   layering a top belt over a bottom belt in such a way as to frictionally sandwich a conveyed material against the bottom belt;
   adding one or more pressing rolls along an upper surface of the top belt; and
   laying a weighted blanket along said upper surface prior to adding the one or more pressing rolls,
   whereby resisting the conveyed material from sliding down the incline due to gravity when the incline is over fifteen degrees.

2. The method of claim 1, wherein the one or more pressing rolls are added initially to the weighted blanket, and wherein the one or more pressing rolls transition from the weighted blanket to said upper surface.

3. The method of claim 2, further comprising:
   pressing one or more plenums along said upper surface prior to adding the one or more pressing rolls,
   whereby resisting the conveyed material from sliding down the incline due to gravity when the incline is over fifty degrees.

4. The method of claim 3, wherein the one or more pressing rolls are added initially to the one or more said plenums prior to transitioning to said upper surface.

5. The method of claim 4, further comprising:
   attaching one or more shields upward of each of the one or more plenums, wherein the one or more pressing rolls are added initially to one or more shields, and wherein the one or more pressing rolls transitions from the one or more shields to said upper surface.

* * * * *